United States Patent [19]

Mareydt

[11] Patent Number: 4,616,772

[45] Date of Patent: Oct. 14, 1986

[54] CARRIER RACK AND STANCHION

[76] Inventor: Ray G. Mareydt, 1800 W. Maple Rd., Troy, Mich. 48084

[21] Appl. No.: 676,112

[22] Filed: Nov. 29, 1984

Related U.S. Application Data

[63] Continuation of Ser. No. 462,332, Jan. 31, 1983, abandoned.

[51] Int. Cl.$^4$ .............................................. B60R 9/04
[52] U.S. Cl. .................................... 224/326; 224/324
[58] Field of Search ............... 224/326, 309, 316, 325, 224/324

[56] References Cited

U.S. PATENT DOCUMENTS 4,155,585  5/1979  Bott ...................................... 224/324
4,279,368  7/1981  Kowalski ............................. 224/326
4,487,348  12/1984  Mareydt .......................... 224/309 X

FOREIGN PATENT DOCUMENTS 1155509  6/1969  United Kingdom ................ 224/325

Primary Examiner—Stephen Marcus
Assistant Examiner—David Voorhees

[57] ABSTRACT

The subject matter of this invention is a carrier rack for mounting on an exterior surface of a vehicle to enable luggage or other goods to be carried thereupon. More specifically, the invention relates to a rack including outer rail portions supported above the vehicle surface by stanchion members at least some of which include tie-down features which enable flexible load restraining elements such as ropes, cables or the like to be secured to the stanchion and thereafter be extended across the luggage or other loads to contain the same within the rack and upon the vehicle surface.

1 Claim, 11 Drawing Figures

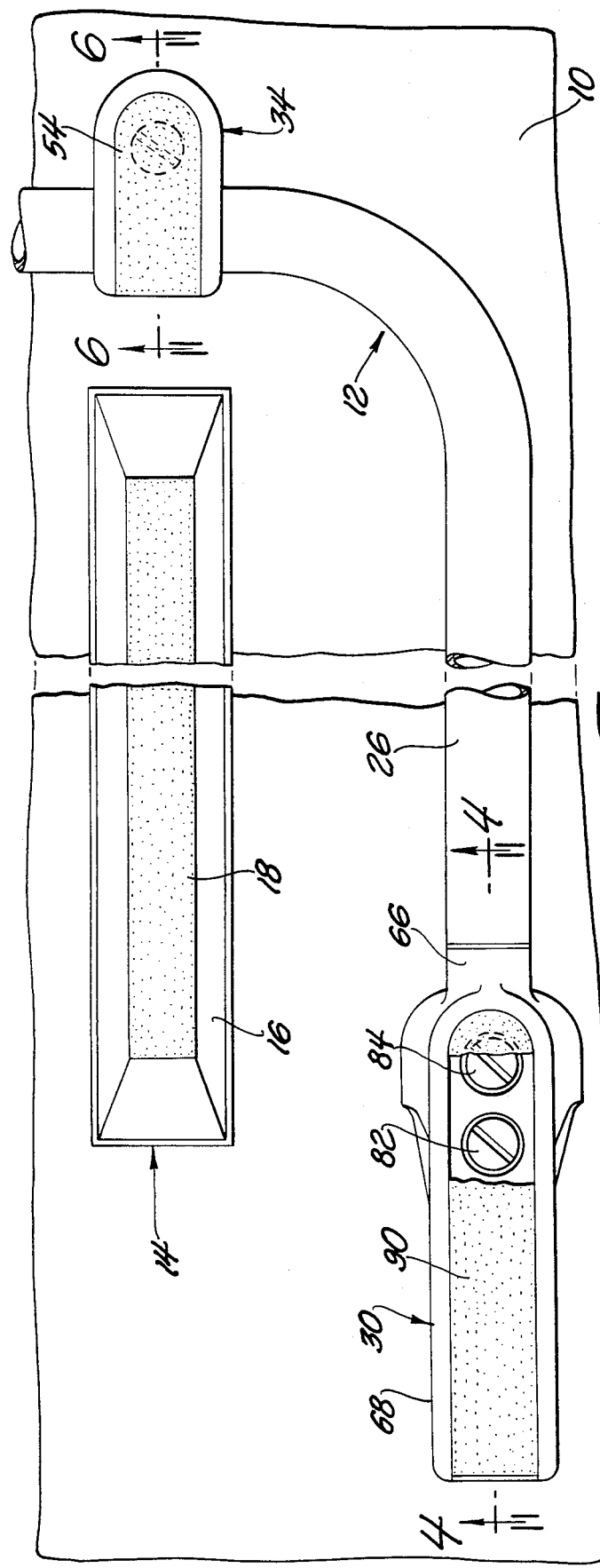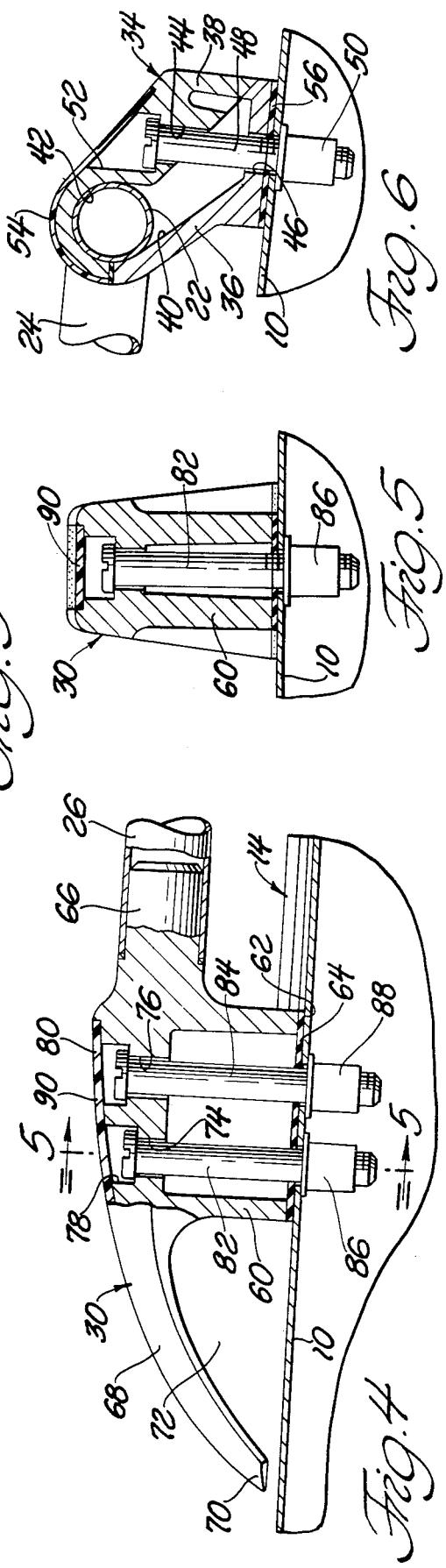

CARRIER RACK AND STANCHION

This is a continuation of application Ser. No. 462,332, filed Jan. 31, 1983, now abandoned.

BACKGROUND OF THE INVENTION

As vehicles become smaller, there is an increasing need for exterior mounted racks or carriers to accommodate loads, including luggage, which were formerly stowable within the passenger compartment or vehicle trunk. With the increasing use of such exterior racks, more attention is being paid both to the appearance of such racks as well as their aerodynamic performance. In other words, there is an increasing effort to streamline the appearance of such racks.

It is a particular purpose of the present invention to create a unique monolithic end stanchion member which both supports a side rail member above the vehicle surface and also provides an unobtrusive cargo tie-down capability.

BACKGROUND ART

Vehicle luggage racks or carrying devices incorporating rope or cable tie-down features are known to be old in the prior art as illustrated in the following U.S. patents: U.S. Pat. Nos. 4,132,335 Ingram; 4,244,501 Ingram; 4,245,764 Kowalski et al; and 4,055,284 Bott. However, applicant is unaware of any prior art teaching of a fixed type stanchion for supporting a rack side rail above a vertical vehicle surface and further which stanchion incorporates a rope or cable tie-down structure which does not project above the rack side rail.

DISCLOSURE OF THE INVENTION

The carrier rack of the present invention is particularly adapted to be mounted on either the trunk or roof portions of a vehicle body. More particularly, the rack includes a U-shape rail member the closed end of which is disposed across the rearward end of the trunk portion while the transversely spaced leg portions project toward the forward end of the trunk where they are respectively supported above the trunk surface by end stanchions. Each end stanchion of the present invention is basically a monolithic or one-piece structural member constructed in such a way that the portion thereof adapted to perform the tie-down function does not project above that portion of the stanchion adapted to support the cross rail. Thus, in side elevation, the stanchion tie-down portion is generally disposed below the luggage restraining side rail.

In particular, the stanchion includes a main body or pedestal portion having a lower surface or base adapted to be supported upon the vehicle surface and an upper surface spaced above the lower surface. Fastening means are adapted to extend vertically through said pedestal portion to secure the stanchion to the vehicle surface. The stanchion also includes a first portion extending laterally from the body portion to telescopingly support a rail member above the vehicle surface. The stanchion includes a second portion which projects laterally in essentially the opposite direction from said first rail supporting stanchion portion. The second stanchion portion terminates in an unsupported or free end laterally spaced from the body portion and adapted to terminate proximate the vehicle surface in a spaced relationship. The stanchion body portion and the second laterally extending portion coact to define an opening which provides a rope or cable tie-down feature.

The details of the invention are set forth in the description which follows.

BRIEF DESCRIPTION OF DRAWINGS

In the drawings:

FIG. 3 is an enlarged plan view of a portion of the carrier rack of FIG. 1;

FIG. 4 is a partially sectioned side elevation of the end stanchion along line 4—4 of FIG. 3;

FIG. 5 is a cross-sectional view of the end stanchion along line 5—5 of FIG. 4;

FIG. 6 is a cross-sectional view of an intermediate stanchion along line 6—6 of FIG. 3;

BEST MODE FOR CARRYING OUT THE INVENTION

Figure 1:
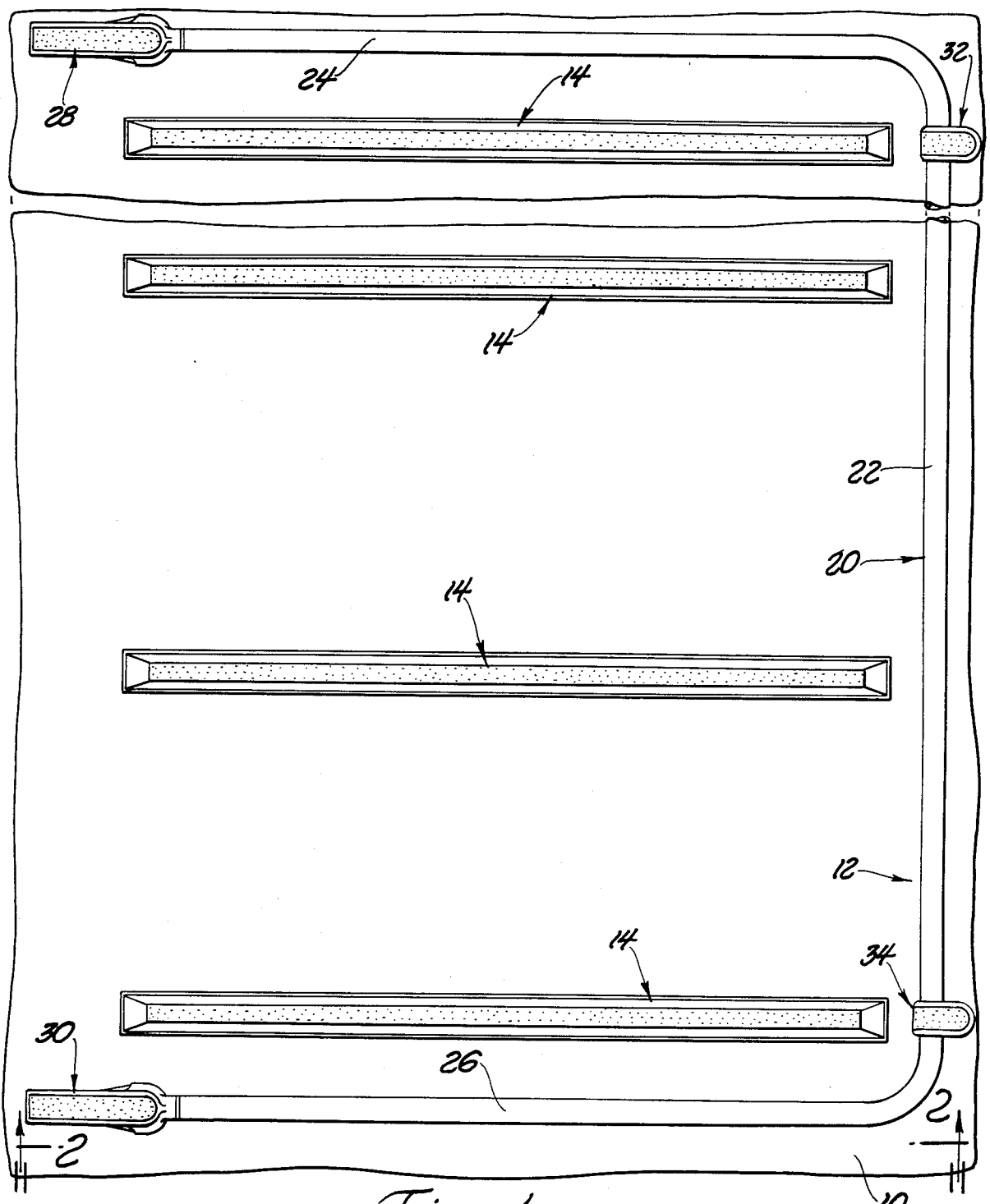
FIG. 1 is a plan view of the carrier rack mounted on the trunk surface of a vehicle.
Figure 2:
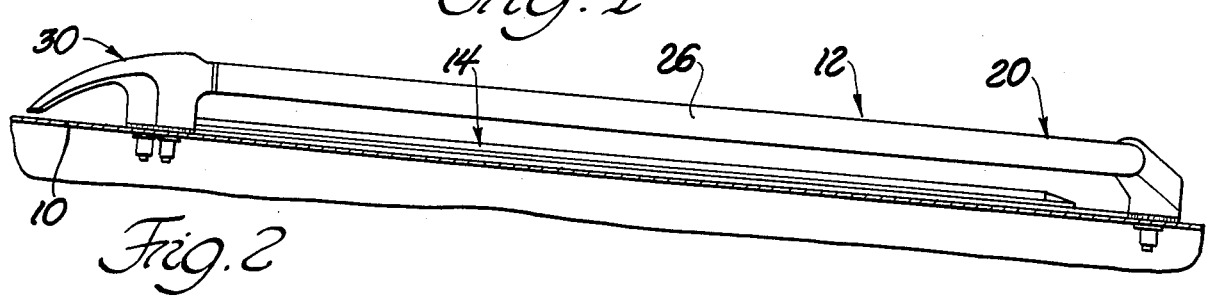
FIG. 2 is a side elevational view along line 2—2 of FIG. 1.

Referring particularly to FIGS. 1 and 2 of the drawings, a vehicle surface is indicated at 10. A luggage or goods carrying rack is indicated generally at 12 and is adapted to be fixedly mounted upon vehicle surface 10. In the modification shown, vehicle surface 10 represents the trunk portion of a vehicle and, thus, is shown in FIG. 2 as sloping from the left or forward end of the trunk surface downwardly toward the right or rearward end of the trunk surface. Rubbing or protective slats 14 are mounted on trunk surface 10 in order to protect the vehicle trunk surface from damage by the loads contained within the rack 12. Protective slats 14 constitute no part of the present invention and normally include a body portion 16 within which an elastomeric material 18 is contained in order to protect the luggage or load against being scratched or otherwise damaged.

Rack 12 includes a U-shape tubular rail member 20 having a closed end portion 22 disposed toward the rearward end of trunk surface 10 and a pair of transversely spaced leg portions 24 and 26 extending longitudinally forwardly of the vehicle and terminating toward the forward end of the trunk surface 10. A first pair of stanchion members 28 and 30 are adapted to support the forward ends of rail leg portions 24 and 26 such that the leg portions are spaced above trunk surface 10. A second pair of stanchion members 32 and 34 are adapted to support the closed end portion 22 of rail 20 above the rear end of trunk surface 10.

Inasmuch as stanchions 32 and 34 are of identical construction, it will only be necessary to describe one of the stanchion members. Accordingly, and as best seen in FIGS. 3 and 6, stanchion 34 includes base and upper portions 36 and 38 adapted to clampingly support rail portion 22 therebetween. More specifically, base portion 36 is adapted to be supported upon trunk surface 10 and includes an upper end having a recessed portion 40 within which rail portion 22 is adapted to be supported. Upper stanchion portion 38 includes an arcuately shaped portion 42 adapted to coact with rail portion 22 and to thereby clampingly retain such portion against base 36. Aligned openings 44 and 46 are respectively formed through stanchion portions 36 and 38 and are adapted to suitably receive a fastening member 48 which, in turn, is adapted to be threadably retained to trunk surface 10 through a suitable nut member 50. Thus, threaded fastening means 48 is adapted to both secure portions 36 and 38 together to clampingly support rail portion 22 and also to secure the stanchion 34 to the trunk surface. Fastener opening 44 in upper stanchion portion 38 is suitably counterbored at 52 in order that the head of fastening means 48 is recessed below the upper surface of the stanchion. A thin and flexible decorative cover member 54 overlays the upper surface of member 38 to conceal and protect fastening member 48. A protective spacer or pad 56 is normally disposed between stanchion 34 and trunk surface 10.

Once again, inasmuch as they are of identical construction, only one of the stanchions 28 and 30 will be described in detail. Stanchion 30 is monolithic in character by which is meant that it is essentially a one-piece member. As best seen in FIGS. 4 and 5, stanchion 30 includes a main body portion or pedestal 60 having a bottom surface 62 adapted to be mounted upon trunk surface 10 normally through an intermediate, thin, elastomeric member 64 adapted to protect the painted surface of the trunk. The upper portion of pedestal 60 includes a first rearwardly projecting portion 66 adapted to telescope within and support the free end of rail leg portion 26 so as to support said rail above the trunk surface. Pedestal 60 includes a second portion 68 projecting from the upper end thereof and extending forwardly of the pedestal in longitudinal alignment with rearwardly projecting portion 66. Forwardly projecting stanchion portion 68 has a curved shape extending horizontally and downwardly from the upper surface of pedestal 60 and terminates in an unsupported end 70 adapted to be proximately spaced above trunk surface 10. Forwardly projecting stanchion portion 68 is generally flat and relatively thin in cross-section such that portion 68 and pedestal 60 coact to define an opening 72. The purpose of opening 72 is to provide a tie-down feature whereby a cable, rope or the like may be fed through such opening and anchored to the stanchion and thereby provide means for securing luggage or other loads within the confines of the rack. Normally, such cable, rope or the like would be secured at one end to the stanchion and would extend generally diagonally across the rack with the other end being looped about or otherwise secured to rail 20. At the same time, one end of a second rope, cable or the like would be secured to the tie-down portion of the other forward stanchion 28 with the rope extending diagonally and rearwardly across the rack to again be secured to another portion of rail 20. Generally such ropes are crisscrossed over the load to restrain the latter within the rack 12 and upon slats 14.

As best seen in FIGS. 4 and 5, stanchion pedestal 60 includes a plurality of openings 74 and 76 extending vertically therethrough. The upper ends of openings 74 and 76 have countersunk portions 78 and 80 whereby head portions of fasteners 82 and 84 are recessed below the upper surface of the stanchion pedestal. The lower ends of fasteners 82 and 84 are adapted to project through suitable openings in trunk surface 10 to threadably engage with nut members 86 and 88 and thereby retain the stanchion upon the trunk surface.

In order to conceal and protect fasteners 82 and 84, a thin cover member 90 is adhered to the upper stanchion surface. Cover member 90, like cover member 54, is preferably formed of a flexible plastic material which may be suitably colored to provide a decorative finish to the upper surface of the stanchion. As shown, upper stanchion surface is slightly recessed to receive cover member 90 in order that the latter is flush with the stanchion outer surface.

Normally stanchions 28 and 30 are formed of metal and most economically are die-cast parts. It is to be understood that the stanchions could also be molded from a suitable structural plastic material.

A modification of the invention is shown in FIGS. 7 through 11 wherein a carrier rack 100 is particularly adapted for mounting upon a vehicle roof 102. Except for cross rail members 104, rack 100 is of identical construction to rack 12. Accordingly, the same rack members are identified by the same numbers plus a prime mark as used in describing rack 12.

Figure 7:
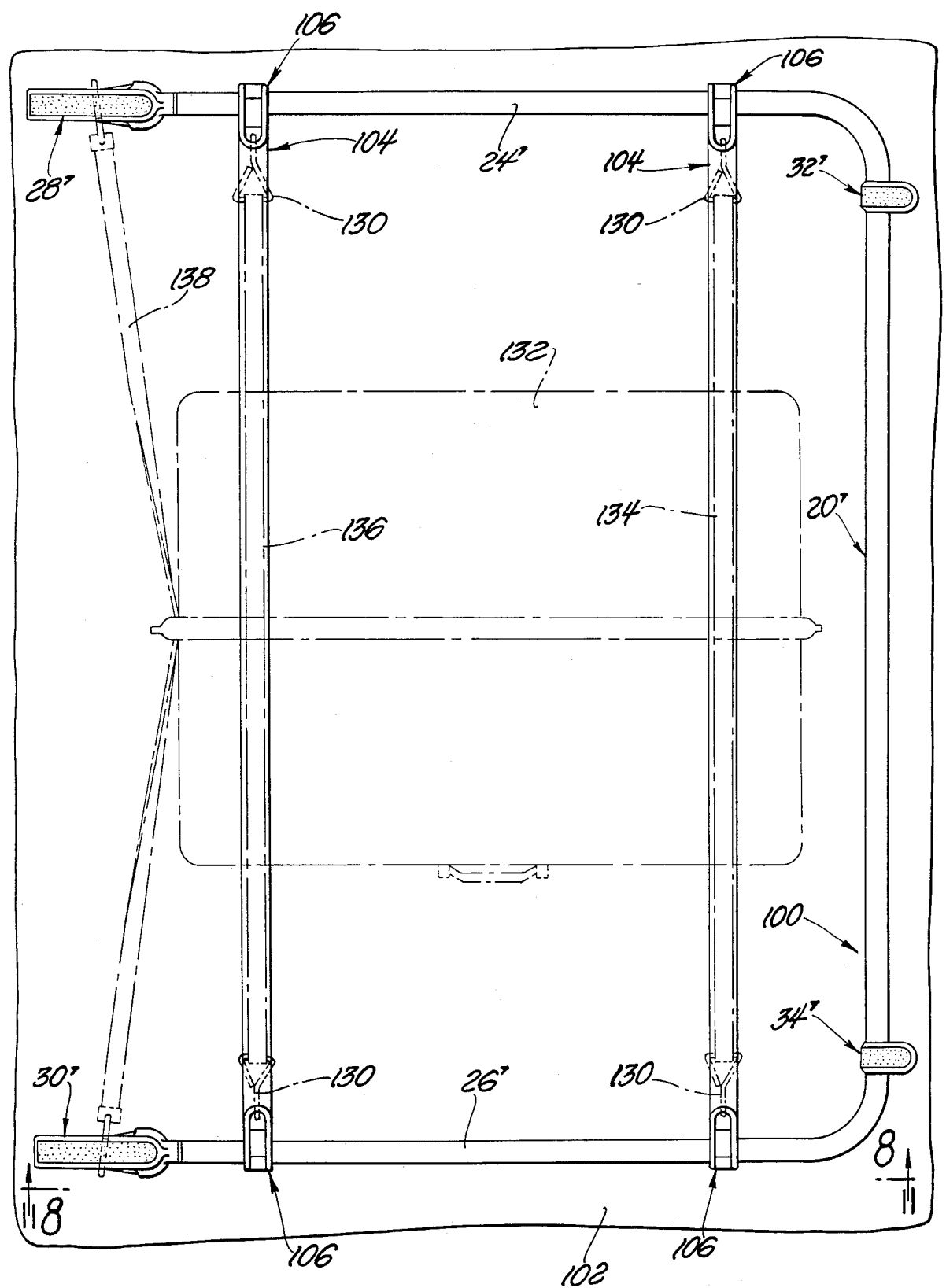
FIG. 7 is a plan view of a roof mounted modification of the carrier rack and stanchion.
Figure 10:
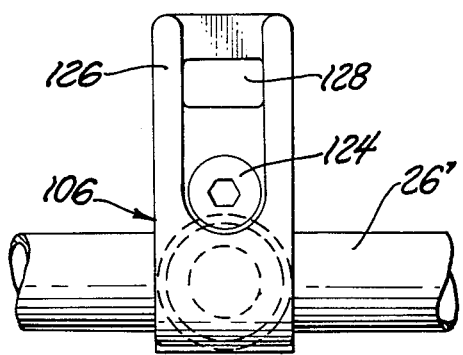
FIG. 10 is a view along line 10—10 of FIG. 9.
Figure 11:
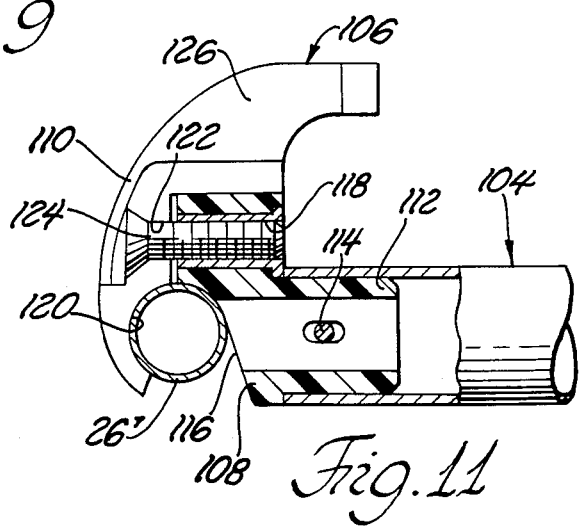
FIG. 11 is a view along line 11—11 of FIG. 9.

As best seen in FIG. 7, rack 100 includes removable cross rail members 104 mounted between longitudinally extending leg portions 24' and 26' of rail member 20'. Cross rail members 104 are of tubular construction and include identical rail mounting devices 106 which, as best seen in FIGS. 10 and 11, include coacting elements 108 and 110. Element 108 includes a transversely extending portion 112 adapted to project within the open end of rail 104 and locked therewithin by a suitable pin element 114. The bottom portion of element 108 includes a recessed section 116 suitably curved to coact with side rail 26'. The upper portion of element 108 includes a threaded transverse opening 118. Element 110 includes a recessed portion 120 corresponding to the curved area of portion 116 of element 108. A transverse opening 22 is formed through element 110 and adapted to be aligned with opening 118 in element 108. A screw member 124 extends through opening 122 and is threaded into opening 118 to clampingly engage rail member 26' between elements 108 and 110. It is obvious that cross rail members 104 may be either longitudinally adjusted or removed from the side rails 24' and 26' by loosening screw member 124 to release the clamping action of elements 108 and 110 relative rails 24' and 26'.

Figure 9:
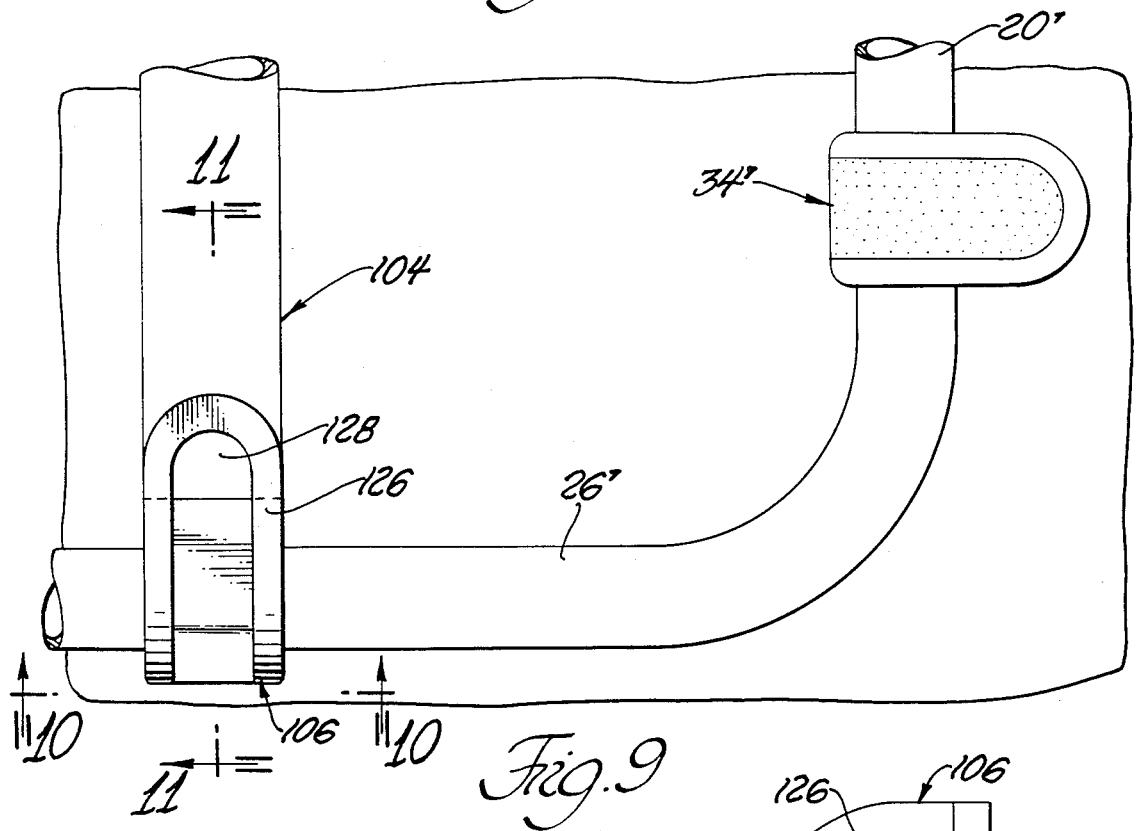
FIG. 9 is an enlarged fragmentary view of a portion of the rack of FIG. 7.

As particularly seen in FIGS. 9, 10 and 11, element 110 includes an upper portion 126 which projects transversely inwardly so as to be spaced vertically above cross rails 104. An opening 128 is formed in upper portion 126 and is adapted to receive one end of a tie-down member such as strap hook 130 indicated in phantom in FIG. 7.

Figure 8:
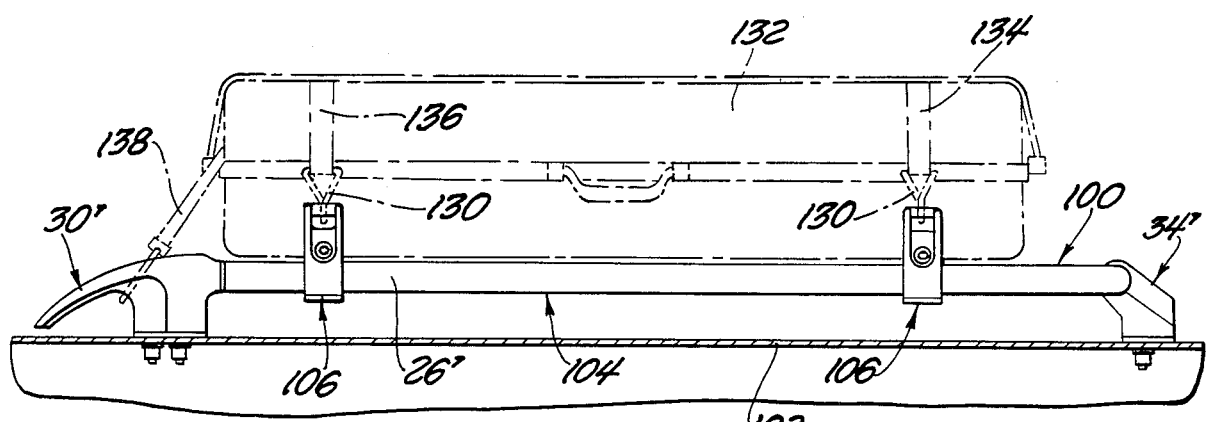
FIG. 8 is a view along line 8—8 of FIG. 7.

By way of illustration, a suitcase 132 and a series of straps 134, 136 and 138 are shown in phantom in FIGS. 7 and 8 to depict the manner in which a load may be carried and retained on carrier 100.

In order to reduce aerodynamic drag and thereby improve fuel economy as well as to deemphasize the bulk of rack 100 when luggage or the like is not being carried thereon, it is anticipated that cross rails 104 will be removed by means of the simple unclamping of mounting devices 106.

It is to be understood that other modifications of the invention may be made within the intended scope of the invention as set forth in the hereinafter appended claim.

What is claimed is:

1. A carrier rack of the type adapted to be mounted upon an exterior surface of the trunk portion of a vehicle, said rack including a load restraining rail supported by stanchion means above the vehicle trunk surface and fastening means adapted to secure said stanchion means to said surface, the improvement comprising:
  a. said rail being of a U-shape configuration with its closed end portion extending transversely of the rearward end of the trunk surface and a pair of transversely spaced leg portions projecting forwardly from the closed end portion and respectively terminating toward the forward end of said trunk surface,
  b. a first pair of stanchion members adapted to support respectively the forward ends of the rail leg portions, each stanchion comprising:
    (1) a pedestal having a base adapted to be supported upon the trunk surface,
    (2) fastening means coacting with said pedestal and adapted to engage with the trunk surface to fasten each stanchion thereto,
    (3) a first integral portion projecting rearwardly from the upper end of said pedestal and telescopingly supporting the forward end of one rail leg portion above said trunk surface,
    (4) a second integral tie-down portion longitudinally aligned with said first integral portion and projecting forwardly and downwardly from the upper end of said pedestal, said second integral portion having an unsupported end spaced forwardly of the pedestal and terminating proximate said trunk surface in a spaced relationship thereto whereby said second integral portion and said pedestal coact to define a cargo tie-down opening, said second integral portion has a curved shape extending downwardly from the upper end of the pedestal, said pedestal including an outwardly opening recessed portion and said fastening means disposed within said recessed portion, and a flexible cover member adhered to said pedestal so as to enclose said recessed portion and said fastening means, and wherein said flexible cover member being flush with the upper end of said pedestal, and
  c. a second pair of stanchion members supporting the closed end portion of said tubular rail above the trunk surface, and
  d. rail mounting devices for securing at least one cross rail member between said spaced leg portions, each rail mounting device including first and second coacting elements, said first coacting element including a portion projecting within an open end of said cross rail member, said second coacting element secured to said first coacting element for clamping engaging a rail leg portion therebetween, and said second coacting element including an upper portion which is spaced vertically above said cross rail member and having an opening therethrough for receiving one end of a tie-down member.

* * * * *